Dec. 24, 1935.  B. G. BROWN  2,025,438
FOCUSING DEVICE FOR CAMERAS
Filed Jan. 21, 1935  2 Sheets-Sheet 1
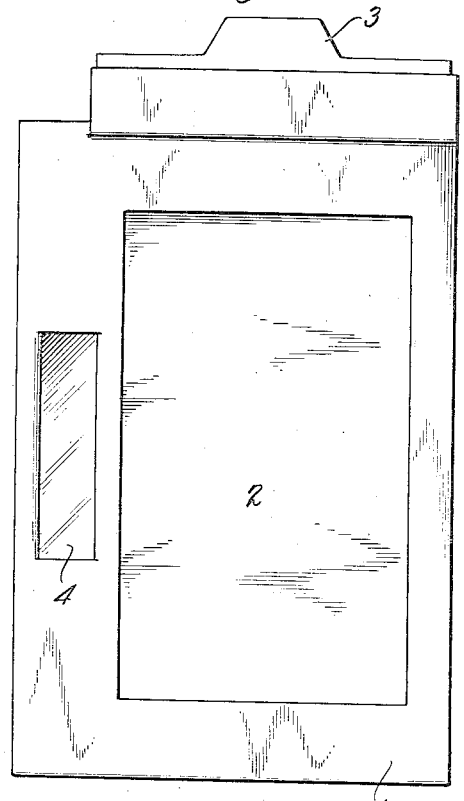
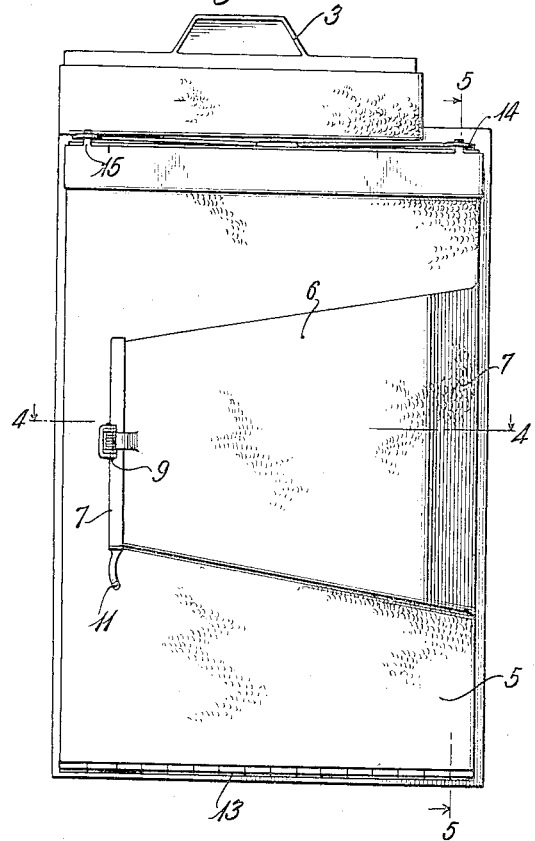
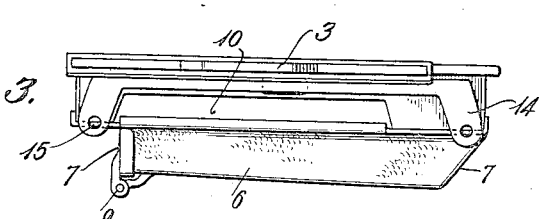
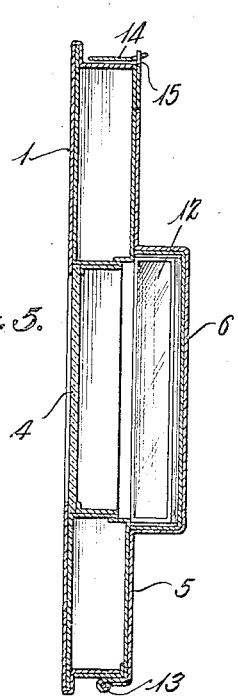
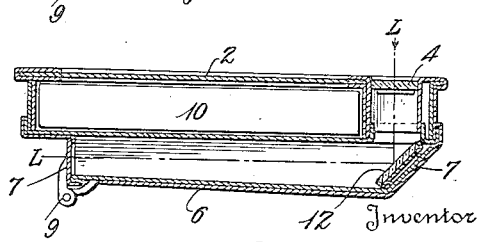
Inventor
Benjamin G. Brown
By Samuel Lebowitz
Attorney Dec. 24, 1935.                    B. G. BROWN                    2,025,438
                           FOCUSING DEVICE FOR CAMERAS
                              Filed Jan. 21, 1935                2 Sheets-Sheet 2
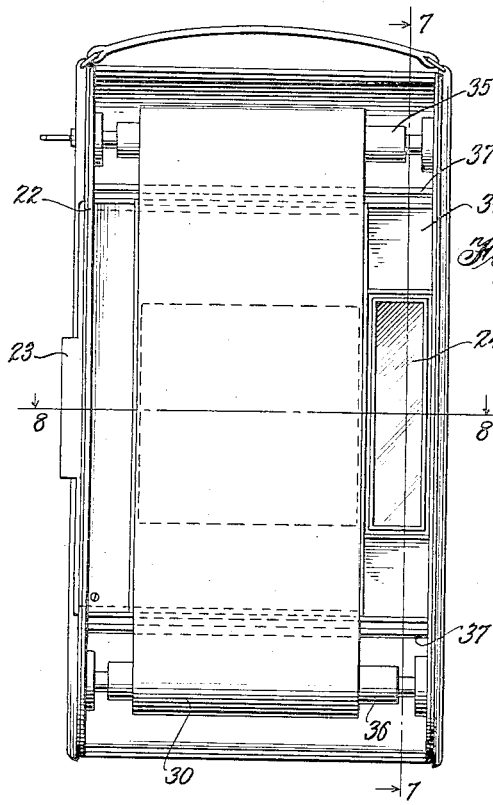
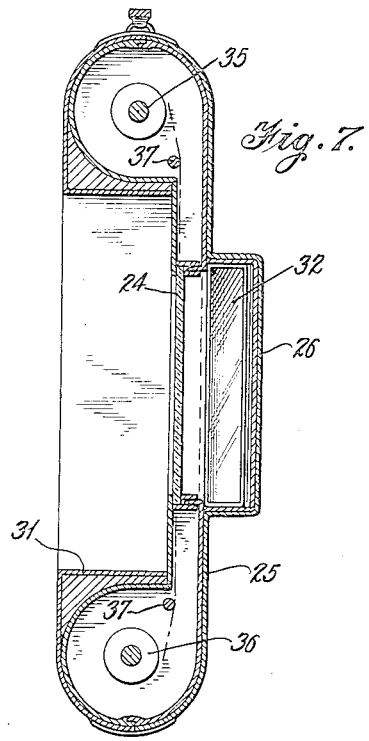
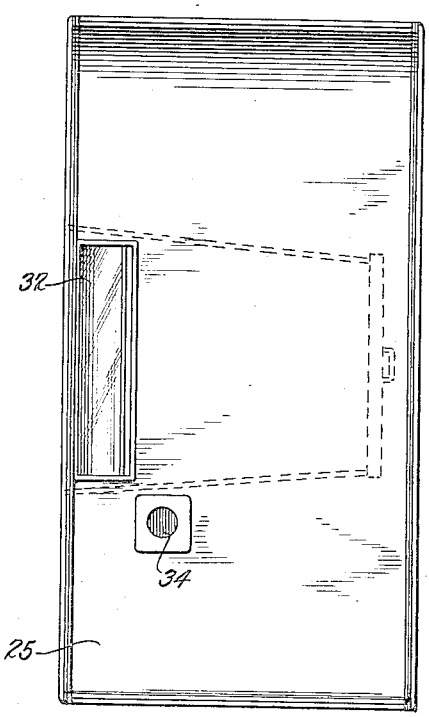
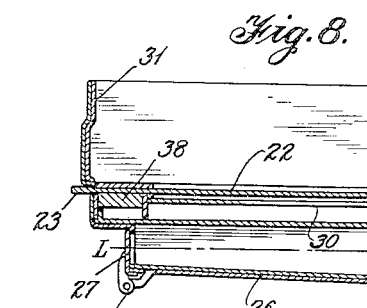
Inventor
Benjamin G. Brown
By Samuel Lebowitz
Attorney Patented Dec. 24, 1935

2,025,438

UNITED STATES PATENT OFFICE 2,025,438

FOCUSING DEVICE FOR CAMERAS

Benjamin G. Brown, Salt Lake City, Utah

Application January 21, 1935, Serial No. 2,808

6 Claims. (Cl. 95—44)

This invention relates to improvements in cameras and more particularly to focusing devices therefor.

It is the object of the invention to provide a focusing device for a camera using either roll films, film packs or plates which is simple in construction and operation. More particularly, the invention contemplates a permanent placement of a focusing screen in the plane occupied by the film to be exposed and the reflection of the image thereon through a light-tight chamber which may be opened by the operator during the focusing operation. In the course of the focusing operation, while the lens shutter is open, the film to be exposed is protected by a shield which is removed after the lens of the camera is focused accurately and the shutter is closed, preparatory to the exposure of the film in the usual manner. By means of the arrangement according to the invention, the application and removal of focusing screens to obtain a proper positioning of the lens, are rendered unnecessary.

It is the object of the invention to utilize a space within the circular range of vision of the lens adjacent the exposed film, which heretofore has been wasted, for the purpose of providing a focusing screen which requires no manipulation between the focusing and exposing periods.

It is a further object of my invention to provide a focusing arrangement which is as easily applicable to cameras of existing types and dimensions as it is to new models which may be developed.

Other objects and purposes of the invention will appear from the following detailed description thereof taken in conjunction with the accompanying drawings, wherein:

Fig. 1 is a front elevation of the back of a camera employing a film pack.

Fig. 2 is a rear view thereof.

Fig. 3 is a plan view of Fig. 2.

Fig. 4 is a sectional view along lines 4—4 of Fig. 2.

Fig. 5 is a sectional view along lines 5—5 of Fig. 2.

Fig. 6 is a rear elevation of a camera using roll films, and illustrating a second embodiment of the invention.

Fig. 7 is a sectional view along lines 7—7 of Fig. 6.

Fig. 8 is a sectional view along lines 8—8 of Fig. 6, and

Fig. 9 is a front elevation of the back of the camera shown in Fig. 7, which is adapted to be placed over the body of the camera shown in Fig. 6.

In Fig. 1 is shown a front wall 1 of the camera back which is designed to be applied to a camera of any existing type. A compartment 19 (Fig. 4) is provided behind the front wall 1 for receiving a film pack of any suitable size. A shield 2, having a hand-grip 3 at one end thereof for the purpose of convenient manipulation, protects the foremost film from exposure until the shield is withdrawn. A focusing screen 4 made of, for instance, ground glass, is fixed in the front wall 1 on the side of the exposure area of the films, and is adapted to receive an image in the same plane as the film to be exposed. This image is reflected through a light-tight chamber 6 on the back 5 of the film pack container for observation by the operator by the opening of cover 7. The chamber 6 is of small depth so that the size of the camera is not increased materially thereby. The rays of light passing through the open shutter and presenting an image on the ground glass focusing screen, are reflected from a mirror 12 mounted upon the bevelled portion 7 of the compartment 6 along line L—L to the eye of an observer. The mirror is preferably disposed at an angle of 45° to the plane of the front wall 1 to reflect the image transversely of the depth of the chamber. The lid 7 is mounted upon a spring hinge 9 and is adapted to be opened by the manipulation of the hand-grip 11 against the force of the spring, which assures its closure after the lens is suitably adjusted at the proper focus. When the desired focal adjustment is attained, the lens shutter is closed and the film is exposed in the usual manner after the protective shield 2 is withdrawn.

The film pack 19 may be conveniently inserted and removed from the ground glass film pack adapter by the dropping of the back 5 around the hinges 13. The back is retained in place by the engagement of lugs 15 with spring clips 14 provided at the top of the camera back (Fig. 5).

A second embodiment of the invention, showing its applicability to cameras using roll films, is illustrated in Figs. 6–9. In this case a rolled film 30 is designed to pass from roller 36 onto roller 35 while being guided by rollers 37 through its plane of exposure. A focusing screen 24 is fixedly mounted in the camera frame 31 in the same plane as the plane of exposure of the film. A removable shield 22 having a hand-grip 23 protects the film against exposure during the focusing operation. A block 36 is disposed adjacent the film if such is necessary to render the camera light-tight. The camera back 25 is designed to fit over the frame 31, having the usual sighting aperture 34 for indicating the extent of film travel for successive exposures. The loading of the camera remains the same. The light-tight chamber 26 is fixed on the exterior of the camera back. The angularly disposed mirror 32 is at one end of the chamber for transversely reflecting the image on the focusing screen through the opening in the chamber; which opening is covered by the lid 27, mounted upon spring hinge 29.

The construction shown in Figs. 6–8 may be modified in an obvious manner so that the camera back 25 has formed as an integral part thereof the ground glass screen 24. It is essential, that in the assembled position of the camera, the screen be in the same plane as the exposed film. An adapter of this type may be used interchangeably with the original back of the camera.

A 3A camera, adapted to take a 3¼" x 5½" picture may be adapted to use a standard size #116 roll film giving eight (8) 2½" x 4¼" pictures from a single roll, and also affording ground glass focusing, so necessary for good pictures. Thereby great economies as well as better pictures result from the use of the instant invention.

It is understood that the ground glass screen in the embodiment shown in Figs. 1–5, may as well be placed below the exposure area instead of on the side of it. For example, a 3A roll film Kodak, which is adapted to take a postcard picture of 3¼" x 5½" may be modified to use a size 541 film pack which takes a picture of 3½" x 4¾". In this case, a portion of the length of the normal exposure area of the 3A Kodak is allotted to the focusing screen which is placed at the bottom of the front wall 1 of the adapter back. In such a modified construction, the reflecting chamber 6 is disposed longitudinally of the camera back, at right angles to that shown in Fig. 2, with the lid 7 arranged near the top of the camera.

The film adapters according to the instant invention embodying the novel focusing device may be used interchangeably with the original backs of the cameras, in such cases where focusing refinements are not desired. Other changes in details of the construction and design of the focusing devices may be made without departing from the spirit of the invention, as defined in the accompanying claims.

The designation of the "permanent" or "fixed" mounting for the focusing screen as employed in the specification and claims refers to such mountings in the assembled condition of the camera in the sense that such focusing screens are not removable as is usually the case with such screens in the prior art. It is understood that the focusing screen may be a part of the main camera frame or may be included in a detachable part of the camera which upon the assembly thereof results in the structures defined by the accompanying claims.

What I claim is:

1. In a focusing device for a camera, supporting means for a light-sensitive film, a focusing screen fixedly mounted adjacent the light-sensitive film in the same plane therewith, a removable shield in front of said light-sensitive film for preventing exposure thereof during the focusing operation, a light-tight chamber formed on the camera behind said focusing screen having an opening therein, a cover for said opening, and a mirror in said chamber for reflecting the image on said focusing screen through said opening.

2. The combination claimed in claim 1 wherein said cover is fitted with spring means tending to maintain the opening in the chamber covered thereby.

3. In a focusing device for a camera, supporting means for a light-sensitive surface, a focusing screen permanently mounted adjacent the light-sensitive surface in the same plane therewith, a chamber of slight depth formed on the camera having an opening therein, a cover for said opening, and a reflecting surface in said chamber for reflecting the image on said focusing screen through said opening transversely to the dimension of depth of said chamber.

4. In a focusing device for a camera, supporting means for a light-sensitive film, a focusing screen fixedly mounted adjacent the light-sensitive film in the same plane therewith, a removable shield in front of said light-sensitive film for preventing exposure thereof during the focusing operation, a light-tight chamber of small depth fixed on the camera behind said focusing screen having at one end thereof a mirror behind said focusing screen disposed angularly with respect to the plane of said screen and an opening at the opposite end thereof, a cover for said opening, said mirror being adapted to reflect the image on said screen through said opening in a direction transverse to the dimension of depth of said chamber.

5. In a focusing device for a camera, a frame having a compartment therein for receiving a film pack, an opening in said frame defining the light-sensitive surface of the foremost film in the pack, a ground-glass screen in said frame adjacent the opening in the same plane as the foremost film, a chamber of small depth formed in the back of said frame and extending beyond an edge of said compartment, a mirror in said chamber behind said ground-glass screen and beyond said edge of said compartment, an opening in chamber at the end thereof opposite said mirror, said mirror adapted to reflect the image on said focusing screen through said opening.

6. In a focusing device for a camera, roller means for guiding a light-sensitive film roll through a predetermined plane for exposure, a focusing screen fixedly mounted on the camera adjacent the film roll in said plane, a removable shield in front of said film at the field of exposure thereof for preventing said exposure during the focusing operation, a detachable back for the camera having a light-tight chamber of small depth formed on the exterior thereof, a reflecting surface in said chamber in alignment with said focusing screen, an opening at the opposite end of said chamber, and a cover for said opening, said mirror being adapted to reflect the image on said focusing screen through said opening.

BENJAMIN G. BROWN.